(12) United States Patent
Kabel et al.

(10) Patent No.: US 6,909,946 B1
(45) Date of Patent: Jun. 21, 2005

(54) SYSTEM AND METHOD FOR WIRELESSLY LINKING ELECTRONIC MARINE COMPONENTS

(75) Inventors: Darrin W. Kabel, Overland Park, KS (US); Jonathan C. Burrell, Olathe, KS (US)

(73) Assignee: Garmin Ltd. (KY)

(*) Notice: Subject to any disclaimer, the term of this patent is extended or adjusted under 35 U.S.C. 154(b) by 5 days.

(21) Appl. No.: 10/284,830

(22) Filed: Oct. 31, 2002

(51) Int. Cl.[7] .............................................. G06F 19/00
(52) U.S. Cl. .................................... 701/21; 340/984
(58) Field of Search .......................... 701/1, 21, 36; 340/484

(56) References Cited

U.S. PATENT DOCUMENTS

| | | | |
|---|---|---|---|
| 4,323,992 A | * 4/1982 | Tobin, Jr. .................. | 367/108 |
| 5,072,209 A | * 12/1991 | Hori et al. ................. | 340/432 |
| 5,509,369 A | 4/1996 | Ford et al. .................. | 114/150 |
| 5,632,217 A | 5/1997 | Ford et al. .................. | 114/150 |
| 5,917,405 A | 6/1999 | Joao ........................... | 340/426 |
| 5,995,000 A | * 11/1999 | King ........................... | 340/438 |
| 6,069,588 A | 5/2000 | O'Neill, Jr. ................. | 343/713 |
| 6,246,376 B1 | 6/2001 | Bork et al. ................. | 343/760 |
| 6,255,800 B1 | 7/2001 | Bork ........................... | 320/115 |
| 6,339,706 B1 | 1/2002 | Tillgren et al. ............. | 455/419 |
| 6,345,179 B1 | * 2/2002 | Wiegers et al. ............. | 455/344 |
| 6,374,079 B1 | 4/2002 | Hsu ............................ | 455/11.1 |
| 6,581,025 B2 | * 6/2003 | Lehman ....................... | 702/178 |
| 6,693,586 B1 | * 2/2004 | Walters et al. ........... | 342/357.13 |
| 6,742,052 B2 | * 5/2004 | Himmel et al. .............. | 710/2 |
| 2004/0003051 A1 | * 1/2004 | Kryzanowski et al. ....... | 709/217 |

* cited by examiner

*Primary Examiner*—Michael J. Zanelli
(74) *Attorney, Agent, or Firm*—Devon A. Rolf

(57) ABSTRACT

A system and method for wirelessly linking electronic marine components (14) to associated displays (16) to reduce or eliminate the need for application-specific wiring between the components (14) and the displays (16). The system includes an electronic component (14) adapted for mounting on a marine vessel (12) and operable for generating data representative of a function of the electronic component (14); a wireless transmitter (20) coupled with the electronic component (14) for wirelessly transmitting the data; a display (16) adapted for mounting on the marine vessel (12) remotely from the electronic component (14) and operable for displaying information corresponding to the data; and a wireless receiver (24) coupled with the display (16) and operable for wirelessly receiving the data from the wireless transmitter (20). The wireless transmitter (20) and the wireless receiver (24) transmit and receive the data via BlueTooth or WiFi communication protocols.

17 Claims, 2 Drawing Sheets

SYSTEM AND METHOD FOR WIRELESSLY LINKING ELECTRONIC MARINE COMPONENTS

BACKGROUND OF THE INVENTION

1. Field of the Invention

The present invention relates to electronic marine components such as depth sounders, GPS receivers, marine radios, and displays. More particularly, the invention relates to a system and method for wirelessly linking electronic marine components to reduce or eliminate the need for application-specific wiring between the components.

2. Description of the Prior Art

Many marine vessels are outfitted with a multitude of electronic components such as depth sounders, GPS receivers, marine radios, electronic compasses, autopilots, altimeters, tilt sensors, weather sensors, and marine stereo receivers. Most of these electronic components also include associated displays which display data or information generated by the components. For example, depth sounder assemblies typically include at least one display for displaying a measured depth of a body of water. Many larger marine vessels include multiple- displays for each electronic component. For example, it is common for a depth sounder assembly to include a display mounted at the helm of a vessel and another display mounted in the captain's chambers. On even larger boats, further displays are mounted in other areas, such as crow's nests, secondary helms, etc. It is also sometimes desirable to connect electronic marine components to one another in a networked fashion. For example, several weather sensors may be networked together and connected to a single display to display various weather conditions such as temperature, wind speed, etc. on the display.

Electronic marine components are typically hard-wired to their displays, to each other, and to a source of power. Wiring to a source of power is typically not a problem because most marine vessels include one or more power busses that can be easily tapped into to receive power. However, wiring multiple electronic components to their displays and to each other is problematic because most marine vessels have a limited amount of available space for such wiring, especially near their helms, which are crowded with other components, instruments, and displays. Installing wiring between electronic components and their displays is especially problematic for "after-market" components that are installed after a vessel has been built because doing so often requires the removal and reinstallation of carpeting, trim, or other components. Additionally, special care must be taken not to disturb the watertight and/or weatherproof nature of a vessel when installing components and wiring therein.

SUMMARY OF THE INVENTION

The present invention solves the above-described problems and provides a distinct advance in the art of electronic marine components and their associated displays. More particularly, the present invention provides a system and method for wirelessly linking electronic marine components to reduce or eliminate the need for application-specific wiring between the components and their associated displays.

One embodiment of the present invention broadly includes an electronic component adapted for mounting on a marine vessel and operable for generating data representative of a function of the electronic component; a wireless transmitter coupled with the electronic component for wirelessly transmitting the data; a display adapted for mounting on the marine vessel remotely from the electronic component and operable for displaying information corresponding to the data; and a wireless receiver coupled with the display and operable for wirelessly receiving the data from the wireless transmitter. The electronic component may be a depth sounder, a GPS receiver, a marine radio, an electronic compass, an autopilot, an altimeter, a tilt sensor, a weather sensor, a marine stereo receiver, or any other conventional electronic component. The display may be specially configured for use with the electronic component or may be a conventional general purpose display. In preferred forms, the wireless transmitter and the wireless receiver transmit and receive the data via BlueTooth or WiFi communication protocols.

The present invention permits data to be wirelessly transmitted between the electronic component and the display, thus eliminating the need for application-specific wiring between the component and display. This allows electronic components and their associated displays to be more easily installed in a marine vessel without compromising the watertight and/or weatherproof characteristics of the vessel, even when the electronic components and displays are installed after the vessel has been built.

In another embodiment of the invention, the system includes multiple displays mounted in different locations of the marine vessel. For example, a first display may be mounted in a helm area of the marine vessel and a second display may be mounted elsewhere such as in the captain's chambers or a crow's nest.

In another embodiment of the invention, the system also includes a wireless control unit including a controller and a wireless transceiver for wirelessly networking multiple electronic components and displays together. The wireless control unit wirelessly receives data from an electronic component and then re-transmits at least a portion of the data to the wireless receiver coupled with one or more of the displays. The wireless control unit allows multiple electronic marine components and their associated displays to be networked together so that an operator of the vessel may configure the network in a preferred manner. For example, the wireless control unit may be programmed to transmit certain data to a first display and other data to a second display to meet the needs and/or desires of an operator of the vessel. If additional electronic marine components are then installed in the vessel, the wireless control unit may be reconfigured to change the transmission preferences.

Another embodiment of the invention includes an integrated "smart" sonar transducer operable to sense the depth of a body of water, generate data corresponding to the depth, and then wirelessly transmit at least a portion of the data to a remote device such as a display.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
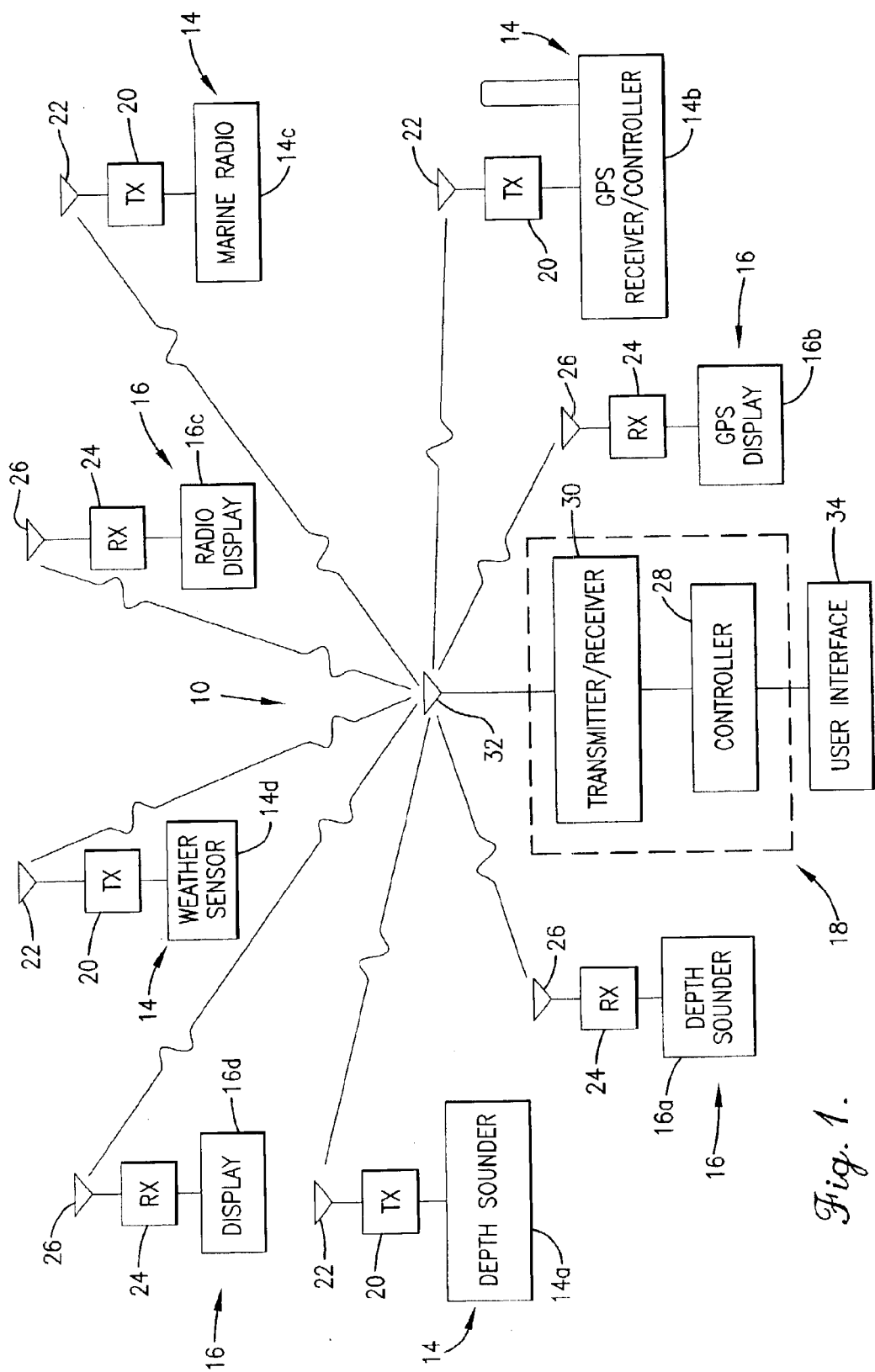
FIG. 1 is a block diagram depicting a system for wirelessly linking electronic marine components as constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
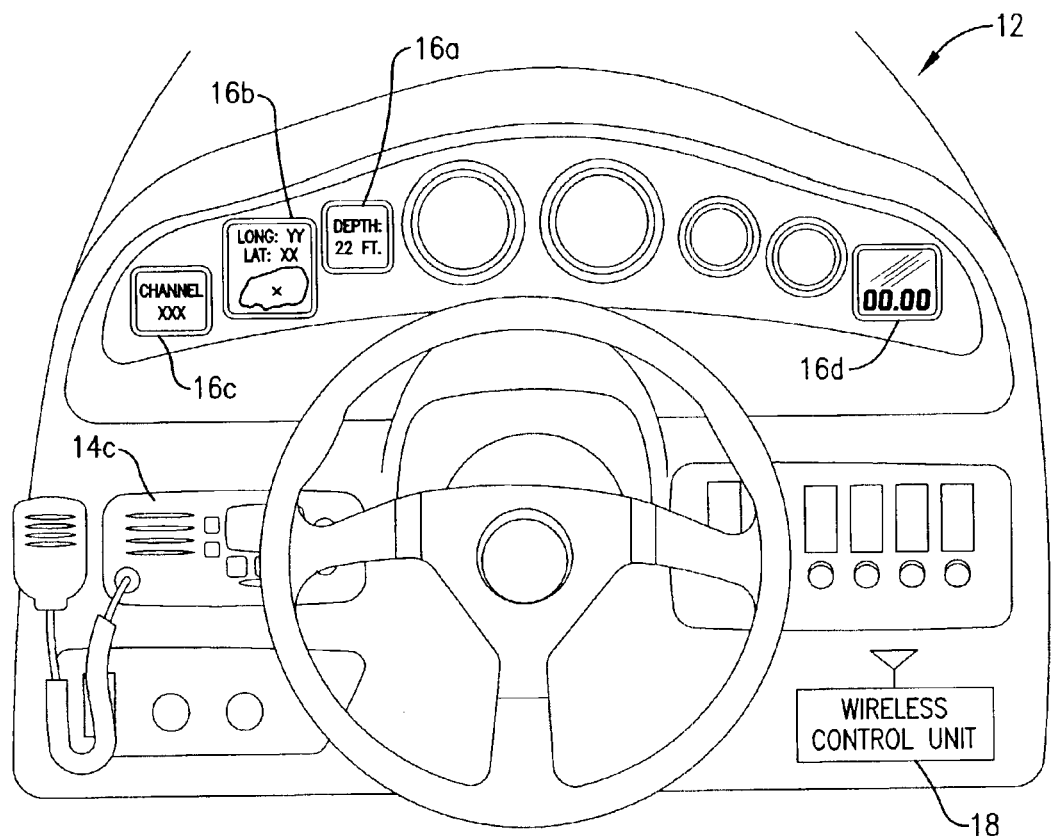
FIG. 2 is an isometric view of a helm of a conventional marine vessel showing portions of the present system mounted therein.

Turning now to the drawing figures, and particularly FIGS. 1 and 2, a system 10 for wirelessly linking components in a marine vessel 12 is illustrated. The preferred system 10 broadly includes one or more electronic marine components 14, one or more displays 16, and a wireless control unit 18 for controlling the wireless transmission and receipt of data between the electronic marine components 14 and the displays 16 as described in more detail below.

The electronic marine components 14 may be any components configured for mounting in or on the marine vessel 12 such as depth sounders, GPS receivers, marine radios, electronic compasses, autopilots, altimeters, tilt sensors, weather sensors, and marine stereo receivers. Each of the components 14 is operable to generate data representative of a function of the component. For example, if one of the components 14 is a depth sounder, it determines the depth of a body of water in a conventional manner and then generates data representative of this depth measurement. Similarly, if one of the components 14 is a GPS receiver, it determines a location of the marine vessel 12 in a conventional manner and then generates data representative of this location.

Each of the electronic marine components 14 is coupled with a wireless transmitter 20 and an antenna 22 for wirelessly transmitting the data generated by the component. The wireless transmitters 20 and antennas 22 preferably transmit data over radio frequencies as described below.

The displays 16 may be either specially configured for use with the electronic marine components 14 described above or may be conventional general purpose displays. If the displays 16 are specially configured for use with specific electronic components, they may include markings or dials representative of the data generated by the component. For example, if one of the displays 16 is configured for use with a depth sounder, it may include markings to indicate that data displayed thereon corresponds to the depth of a body of water.

Each of the displays 16 is coupled with a radio frequency receiver 24 and an antenna 26 for wirelessly receiving data generated by the electronic marine components 14. The wireless receivers 24 and antennas 26 preferably receive data over radio frequencies.

The wireless control unit 18 provides wireless communication between the electronic marine components 14 and the displays 16 to eliminate the need for application-specific wiring therebetween. The wireless control unit 18 monitors and controls the transmission and receipt of data between the electronic marine components 14 and the displays 16 and preferably includes a controller 28, a radio frequency transceiver 30 coupled with the controller 28, and a radio frequency antenna 32 coupled with the transceiver 30. The controller 28 may be any programmable computing device such as a microcontroller or microprocessor. Likewise, the transceiver 30 and wireless antenna 32 may be any conventional radio components configured for transmitting and receiving wireless radio frequency data.

In preferred forms, the wireless control unit 18 is configured and programmed to use BlueTooth or WiFi transmission protocols. BlueTooth and WiFi devices are designed to transmit short bursts or packets of data over short ranges using unlicenced high-frequency channels such as the 2.4 GHz frequency band. Such communication protocols typically establish a frequency-hopping radio link using many different frequencies at approximately 1 MHz intervals to give a high degree of immunity from interference with other transmissions.

The wireless control unit 18 may also include a user interface 34 such as a keypad or control buttons that permits the controller 28 to be programmed with certain user-specified transmission preferences. For example, the controller 28 may be programmed to receive data from one of the electronic marine components 14 and then transmit at least a portion of this data to a display specifically configured for this component and to a general purpose display. Likewise, the controller may be programmed to receive data from another electronic marine component 14 and then re-transmit at least a portion of this data only to a general purpose display.

FIG. 1 illustrates one embodiment of the present invention for best mode purposes. The invention is not limited to this or any other embodiments disclosed and illustrated herein, but rather may include different and/or additional combinations of electronic marine components 14 and displays 16 as a matter of design choice. The system 10 of FIG. 1 includes a depth sounder assembly 14a, a display 16a associated with the depth sounder assembly 14a, a GPS receiver 14b, a display 16b associated with the GPS receiver 14b, a marine radio 14c, a display 16c associated with the marine radio, a weather sensor 14d, and at least one auxiliary, general purpose display 16d.

The depth sounder assembly 14a may be any conventional depth sounder, but is preferably a microprocessor-based sonar transducer such as the Model No. GSD20 with transducer manufactured and sold by Garmin International. The depth sounder 14a measures the depth of a body of water in a conventional manner and generates data representative thereof. The radio frequency transmitter 20 and antenna 22 coupled with the depth sounder 14a then transmit the data as described below. The transducer portion of the depth sounder assembly 14a is preferably mounted on or near the stem of the marine vessel 12 in a conventional manner and the transmitter 20 and antenna 22 are preferably wired to the transducer.

The depth sounder display 16a is specially configured for displaying at least a portion of the data generated by the depth sounder 14a and may include markings or dials to indicate that data displayed thereon corresponds to a depth of a body of water. The radio frequency receiver 24 and antenna 26 coupled with the depth sounder display 16a receives at least a portion of the data generated by the depth sounder 14a. The depth sounder display 16a may be mounted anywhere in the vessel 12, such as in the control panel of the helm as depicted in FIG. 2. More than one such display may be provided for mounting in different locations of the vessel. For example, one depth sounder display 16a may be mounted in the helm area as previously described and another may be mounted in a captain's chambers, crow's nest or elsewhere.

The GPS receiver 14b may be any conventional GPS unit such as those manufactured and sold by Garmin International. The GPS receiver 14b determines its location in a conventional manner by analyzing GPS satellite signals detected by a GPS antenna and then generates data representative of the location. The GPS receiver 14b may also generate data representative of other functions of the receiver such as cartographic maps, coordinates of prior locations, etc. The radio frequency transmitter 20 and antenna 22 coupled with the GPS receiver 14b then transmit this data as described below. The GPS receiver 14b may be mounted anywhere in the marine vessel but is preferably mounted near the helm area.

The GPS display 16b is specially configured for displaying at least a portion of the data generated by the GPS receiver 14b and received by the radio frequency receiver 24 and antenna 26 coupled with the GPS display 16b. The GPS display 16b may be mounted anywhere in the vessel, such as in the control panel of the helm as depicted in FIG. 2. More than one such display may be provided for mounting in different locations of the vessel. For example, one GPS display 16b may be mounted in the helm area as previously described and another may be mounted in a captain's chambers.

The marine radio 14c may be any conventional marine communications device. The marine radio 14c generates data representative of, among other things, a channel to which the marine radio 14c is tuned. The radio frequency transmitter 20 and antenna 22 coupled with the marine radio 14c then transmit the data as described below. The marine radio 14c is preferably positioned in the helm area of the vessel as depicted in FIG. 2 but may be positioned elsewhere such as in the captain's chambers.

The radio display 16c is preferably specially configured for displaying data generated by the marine radio 14c and received by the radio frequency receiver 24 and antenna 26 coupled with the display 16c. The radio display 16c may be mounted anywhere in the vessel, such as in the control panel of the helm as depicted in FIG. 2. More than one such display may be provided for mounting in different locations of the vessel. For example, one communications display 16c may be mounted in the helm area as previously described and another may be mounted in a captain's chambers.

The weather sensor 14d may be any device operable to sense a weather-related condition such as a temperature sensor, wind speed sensor, humidity sensor, barometric pressure sensor, etc. The weather sensor 14d detects one or more of these weather-related conditions and then generates data representative thereof. The radio frequency transmitter 20 and an antenna 22 coupled with the weather sensor 14d then transmit the data as described below.

The auxiliary, general purpose display 16d is preferably operable for displaying information relating to data from one or more of the electronic marine components 14. For example, the general purpose display 16d may display information from the depth sounder 14a and GPS receiver 14b or just information form the weather sensor 14d. More than one auxiliary display 16d may be provided for mounting in different locations of the marine vessel. For example, one such display may be mounted in the helm area of the vessel as illustrated in FIG. 2, and another may be mounted in a captain's chambers, crow's nest, or elsewhere.

The system 10 illustrated in FIG. 1 operates as follows. The depth sounder assembly 14a, GPS receiver 14b, marine radio 14c, and weather sensor 14d generate data representative of their functions as discussed above. The transmitters 20 and antennas 22 coupled with the components then wirelessly transmit the data. The wireless control unit 18 receives the data from these components 14 and then re-transmits at least a portion of the data to the various displays 16 so that the displays may display information relating to the data.

For example, the wireless control unit 18 may receive data from the depth sounder 14a and then re-transmit a portion of the data to both the depth sounder display 16a and the general purpose display 16d. Similarly, the wireless control unit 18 may receive data from the GPS receiver 14b and then re-transmit at least a portion of this data to the GPS display 16b and to the general purpose display 16d. In contrast, the controller 28 of the wireless control unit 18 maybe programmed to receive data from the marine radio 14c and then re-transmit a portion of this data only to the radio display 16c. Similarly, the controller 28 may be programmed to receive data from the weather sensor 14d and then re-transmit a portion of this data only to one or more of the general purpose displays 16d. As described above, the controller 28 maybe re-programmed with the user interface 34 to change these transmission preferences.

Figure 3:
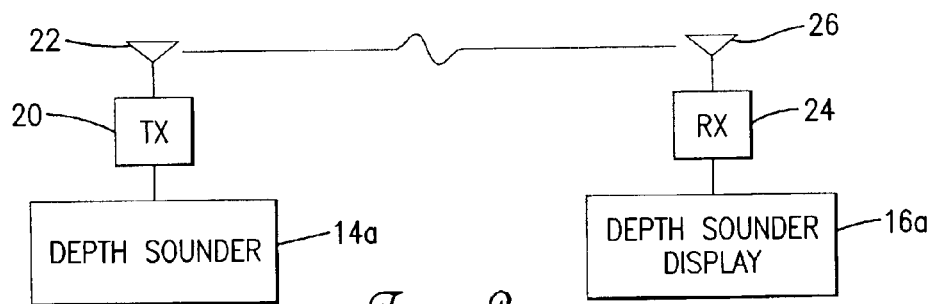
FIG. 3 is a block diagram depicting a system for wirelessly linking electronic marine components as constructed in accordance with a second preferred embodiment of the present invention.

In another embodiment of the invention, some of the electronic marine components 14 may transmit data directly to their associated displays 16 without requiring receipt and retransmission of the data by the wireless control unit 18. FIG. 3 illustrates such an embodiment in which the transmitter 20 and antenna 22 coupled with the depth sounder assembly 14a wirelessly transmits data directly to the antenna 26 and receiver 24 of the depth sounder display 16a. The depth sounder display 16a then displays information corresponding to the data, such as a depth measured by the depth sounder 14a. Other components, such as the GPS receiver 14b and a GPS display 16b or the marine radio 14c and the radio display 16c may also communicate in this manner.

Figure 4:
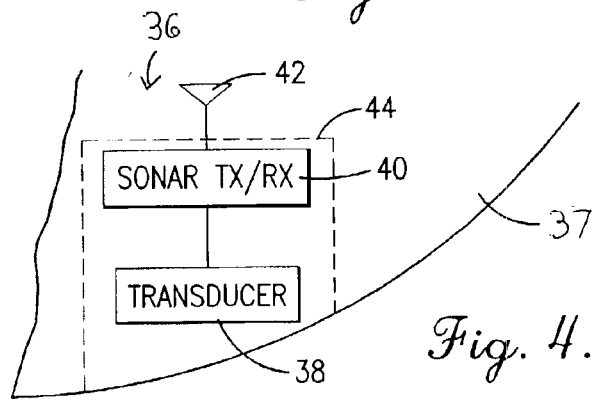
FIG. 4 is a schematic diagram of an integrated sonar transducer and wireless transceiver constructed in accordance with another preferred embodiment of the present invention.

FIG. 4 illustrates an integrated "smart" sonar transducer assembly 36 constructed in accordance with another preferred embodiment of the invention. The integrated transducer assembly 36 is mounted in the hull 37 of a marine vessel and includes a sonar transducer 38 for sensing the depth of a body of water and developing data corresponding thereto, a transmitter or transceiver 40 coupled with the transducer 38 for wirelessly transmitting at least a portion of the data, and a wireless antenna 42 coupled with the transceiver 40. The components of the integrated transducer are preferably integrally mounted in a housing 44 which is positioned in or on the hull 37 as depicted in FIG. 4. The integrated transducer assembly 36 senses and determines the depth of a body of water in a conventional manner and then wirelessly transmits data and/or information relating to the depth to a display or other device mounted elsewhere in the marine vessel. The integrated transducer may also wirelessly receive data, such as data used to calibrate the sonar transducer 38.

Although. the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

1. A system for wirelessly linking components on a marine vessel, the system comprising:
   a first electronic marine component adapted for mounting on the marine vessel and operable to generate data representative of a function of the first electronic marine component, the first electronic component being selected from the group consisting of a GPS receiver,s depth sounder, a marine radio, and an autopilot;
   a wireless communications element coupled with the first electronic marine component for transmitting data from the first electronic marine component to a second marine component, the wireless communication element utilizing a communication protocol selected from the group consisting of WiFi and Bluetooth; and
   wherein the second marine component is selected from the group consisting of a GPS receiver, a depth sounder, a marine radio, and an autopilot.

2. The system as set forth in claim 1, wherein the function of the first electronic marine component includes determining the heading of the marine vessel.

3. The system as set forth in claim 1, wherein the wireless communications element is operable to receive data from the second marine component.

4. The system as set forth in claim 1, further including a third electronic marine element coupled with another wireless communications element such that the other wireless communications element is operable to wirelessly transmit data from the third electronic marine element.

5. A system for wirelessly linking components on a marine vessel, the system comprising:
   a plurality of electronic marine components adapted for mounting on the marine vessel, each marine component being operable to generate data representative of a function of the marine component;
   a wireless communications element coupled with each of the marine components for transmitting the data from each of the marine components; and
   wherein the electronic marine components are selected from the group consisting of an autopilot, a depth sounder, a marine radio, and a GPS receiver.

6. The system as set forth in claim 5, further including a plurality of wireless communications elements such that each marine component is coupled to a corresponding wireless communications element.

7. The system as set forth in claim 6, wherein data may be transmitted from each marine component utilizing the wireless communications elements.

8. The system as set forth in claim 5, wherein the wireless communication element utilizes a communication protocol selected from the group consisting of WiFi and Bluetooth.

9. A method for wirelessly linking components on a marine vessel, the method comprising:
   coupling a first electronic marine component with a first wireless communications element, the first electronic marine component being adapted to mount on the marine vessel;
   coupling a second electronic marine component with a second wireless communications element, the second electronic marine component being adapted to mount on the marine vessel;
   generating first data utilizing the first electronic marine component, the first data representative of a function of the first electronic marine component;
   generating second data utilizing the second electronic marine component, the second data representative of a function of the second electronic marine component;
   wirelessly transmitting the first data from the first electronic marine component utilizing the first wireless communications element;
   wirelessly transmitting the second data from the second electronic marine component utilizing the second wireless communications element; and
   wherein the first electronic marine component includes a GPS receiver.

10. The method as set forth in claim 9, wherein the first electronic marine component includes a depth sounder.

11. The method as set forth in claim 9, wherein the first electronic marine component includes an autopilot.

12. The method as set forth in claim 9, wherein the first electronic marine component includes a marine radio.

13. The method as set forth in claim 9, wherein the first data and second data are transmitted utilizing a communication protocol selected from the group consisting of WiFi and Bluetooth.

14. A method for wirelessly linking components on a marine vessel, the method comprising:
   coupling a first electronic marine component with a first wireless communications element, the first electronic marine component being adapted to mount on the marine vessel;
   coupling a second electronic marine component with a second wireless communications element, the second electronic marine component being adapted to mount on the marine vessel;
   generating first data utilizing the first electronic marine component, the first data representative of a function of the first electronic marine component;
   generating second data utilizing the second electronic marine component, the second data representative of a function of the second electronic marine component;
   wirelessly transmitting the first data from the first electronic marine component utilizing the first wireless communications element;
   wirelessly transmitting the second data from the second electronic marine component utilizing the second wireless communications element; and
   wherein the first electronic marine component includes an autopilot.

15. The method as set forth in claim 14, wherein the first electronic marine component includes a depth sounder.

16. The method as set forth in claim 14, wherein the first electronic marine component Includes a marine radio.

17. The method as set forth in claim 14, wherein the first data and second data are transmitted utilizing a communication protocol selected from the group consisting of WiFi and Bluetooth.

* * * * *